United States Patent
Asipov

(10) Patent No.: US 8,862,893 B2
(45) Date of Patent: Oct. 14, 2014

(54) TECHNIQUES FOR PERFORMING SYMMETRIC CRYPTOGRAPHY

(75) Inventor: Boris Asipov, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 875 days.

(21) Appl. No.: 12/136,772

(22) Filed: Jun. 11, 2008

(65) Prior Publication Data

US 2009/0319805 A1 Dec. 24, 2009

(51) Int. Cl.
- G06F 15/167 (2006.01)
- H04L 29/06 (2006.01)
- H04L 9/32 (2006.01)
- H04L 9/06 (2006.01)

(52) U.S. Cl.
CPC .............. H04L 63/0435 (2013.01); H04L 9/32 (2013.01); H04L 2463/041 (2013.01); H04L 9/0631 (2013.01)
USPC .......................................... 713/189; 713/193

(58) Field of Classification Search
USPC ........................................................ 380/259
See application file for complete search history.

(56) References Cited

U.S. PATENT DOCUMENTS

| | | | |
|---|---|---|---|
| 5,778,072 A | 7/1998 | Samar | |
| 6,477,203 B1 * | 11/2002 | Poplin et al. | 375/240.2 |
| RE38,070 E | 4/2003 | Spies et al. | |
| 7,003,117 B2 | 2/2006 | Kacker et al. | |
| 7,302,571 B2 | 11/2007 | Noble et al. | |
| 2001/0021926 A1 | 9/2001 | Schneck et al. | |
| 2003/0210781 A1 * | 11/2003 | Mihaljevic et al. | 380/28 |
| 2003/0215089 A1 * | 11/2003 | Mihaljevic et al. | 380/42 |
| 2005/0005106 A1 | 1/2005 | Chen et al. | |
| 2005/0050344 A1 | 3/2005 | Hull et al. | |
| 2005/0069127 A1 | 3/2005 | Cheung | |
| 2006/0140411 A1 | 6/2006 | Zhu | |
| 2006/0242415 A1 * | 10/2006 | Gaylor | 713/176 |
| 2006/0277416 A1 * | 12/2006 | Counts et al. | 713/193 |
| 2007/0083769 A1 | 4/2007 | Iwamura | |
| 2007/0101438 A1 | 5/2007 | Govindarajan | |

FOREIGN PATENT DOCUMENTS

| | | |
|---|---|---|
| JP | 10-105620 | 4/1998 |
| JP | 2001-318786 | 11/2001 |
| JP | 2003-223098 | 8/2003 |
| JP | 2003-302899 | 10/2003 |
| JP | 2005-286661 | 10/2005 |
| KR | 1020040083794 | 10/2004 |
| WO | 2008001327 A2 | 1/2008 |

OTHER PUBLICATIONS

Xue (Yuan Xue, "Lecture 5: Ctryptography Basics", Sep. 2006), found on http://vanets.vuse.vanderbilt.edu/~xue/cs291fall06/ "CS 291 Network Security page, listed as "Secret-keyCryptography (Cryptography Basics).*

(Continued)

*Primary Examiner* — Peter Poltorak
(74) *Attorney, Agent, or Firm* — Timothy Churna; Kate Drakos; Micky Minhas

(57) ABSTRACT

Techniques are described for performing decryption using a key-specific decryption engine. A message including an encrypted data portion is received. The encrypted data portion is formed by performing a symmetric encryption operation using a symmetric key. The encrypted data portion is decrypted using a key-specific decryption engine which does not use the symmetric key as an input. Also described are techniques for generating the key-specific decryption engine which may be implemented using boolean functions determined for the symmetric key.

20 Claims, 13 Drawing Sheets

(56) References Cited

OTHER PUBLICATIONS

Meier (Meier et al., Algebraic Attacks and Decomposition of Boolean Functions, Advances in Cryptology—Eurocrypt, 2004).*
Johansson (Johansson et al., "Fast Correlation Attacks through Reconstruction of Linear Polynomials", Crypto 200, LNCS 1880, pp. 300-315, 2000).*
Golomb (Solomon Golomb, "On the Cryptanalysis of Nonlienear Sequences", IMA—Crypto& Coding '99, LNCS 1746, pp. 236-242,1999).*
Porwik (Porwik et al., "Dedicated Spectral Method of Boolean Functio Decomposition", Int. J. Appl. Math. Comput. Sci., 2006, vol. 16, No. 1, 271-278).*
Kaeo (Merike Kaco, "Designing Network Security", ISBN 1-57870-043-4, 1999), p. 6-10.*
Menezes et al. (Alfred J. Menezes, Paul C. van Oorschot, Scott A. Vanstone, "Handbook of applied cryptography", 1997, ISBN: 0849385237), Chapter 7.*
International Search Report and Written Opinion Received for PCT Application No. PCT/US2009/041225, mailed on Nov. 30, 2009, 11 pages.
Dodis, et al., "Exposure-Resilience for Free: the Hierarchical ID-based Encryption Case" Security in Storage Workshop, 2002. Proceedings. First International IEEE, Date: Dec. 11, 2002, pp. 45-52.
Larsson Anders, "Cryptography", Linkoping University, Dec. 15, 2000, 11 Pages.
Chow Sze Ming, Sherman, "Forward Security from Bilinear Pairings: Signcryption and Threshold Signature", University of Hong Kong, Date: Aug. 2004, 148 Pages.
CN Notice on the First Office Action for Application No. 200980123097.2, Jan. 31, 2013.
JP Notice of Reason for Rejection for Application No. 2011-513515, Aug. 22, 2013.
CN Notice on the Second Office Action for Application No. 200980123097.2, Aug. 28, 2013.

* cited by examiner

TECHNIQUES FOR PERFORMING SYMMETRIC CRYPTOGRAPHY

BACKGROUND

Messages may be communicated between a sender and a receiver. The sender and receiver may be, for example, two computer systems, two modules on the same computer system, and the like. Both the sender and receiver may be concerned regarding the security and authentication of the messages exchanged. Different techniques may be used to ensure that a received message is not a modified version of an original message and also to verify the sender's identity. One approach is to use digital signatures when sending a message. Existing techniques for digital signatures use asymmetric cryptography in which different keys are used for encryption and decryption, such as use of public/private key pairs with a PKI (Public Key Infrastructure). When sending a message, a hash value of the message data or content may be generated such as using a cryptographic hash algorithm. The hash value may be encrypted using a sender's private key producing a digital signature of the message. The message data and its digital signature are transmitted to the receiver. The receiver then uses the sender's public key to decrypt the digital signature revealing a hash value as transmitted from the sender. The receiver may then perform verification processing by computing an expected hash value using the transmitted message data and applying the same hash algorithm as the sender. The receiver may then compare the expected hash value to the hash value produced by decryption. If both hash values match, the receiver may conclude that the message data has not changed and that the sender originated the received message. One drawback of using digital signatures with asymmetric cryptographic techniques is that the digital signature may be relatively large in comparison to the message data. Thus, digital signatures may increase the size of the message transmitted by an unacceptable amount such as may be the case, for example, in applications where the size of the transmitted message is subject to a size restriction. Another technique uses symmetric encryption where the same key is used for encryption, as performed by the sender, and decryption, as performed by the receiver. One drawback with the foregoing is that the key may be easily obtained by another, for example, since the key may be stored in a readable form and/or accessible location thereby adversely affecting the receiver's ability to detect message tampering, verify authentication of a message as being transmitted from a particular sender, and the like.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques are described for performing decryption using a key-specific decryption engine generated for each symmetric key. A message including an encrypted data portion is received. The encrypted data portion is formed by performing a symmetric encryption operation using a symmetric key. The encrypted data portion is decrypted using a key-specific decryption engine which does not use the symmetric key as an input. The key-specific decryption engine may be implemented using boolean functions determined for the symmetric key.

DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Figure 1:
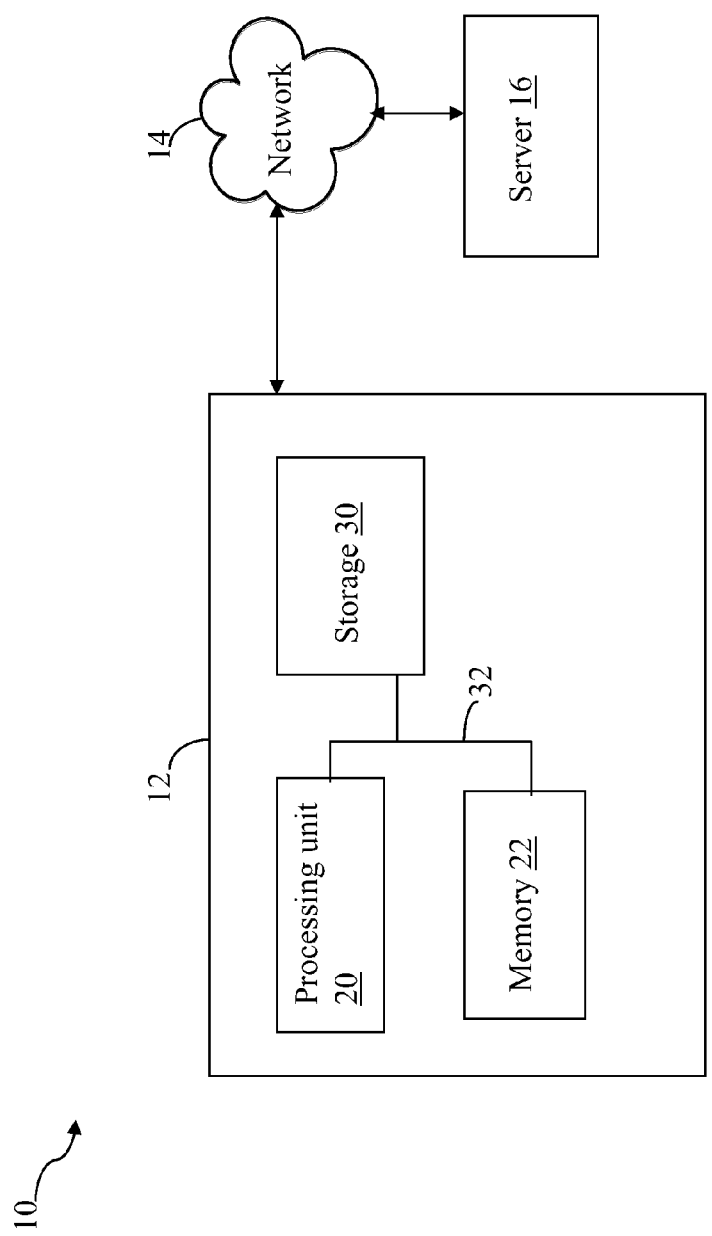
FIG. 1 is an example an environment that may be utilized in an embodiment in connection with the techniques described herein.

Referring to FIG. 1, illustrated is an example of a suitable computing environment in which embodiments utilizing the techniques described herein may be implemented. The computing environment illustrated in FIG. 1 is only one example of a suitable computing environment and is not intended to suggest any limitation as to the scope of use or functionality of the techniques described herein. Those skilled in the art will appreciate that the techniques described herein may be suitable for use with other general purpose and specialized purpose computing environments and configurations. Examples of well known computing systems, environments, and/or configurations include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The techniques set forth herein may be described in the general context of computer-executable instructions, such as program modules, executed by one or more computers or other devices. Generally, program modules include routines, programs, objects, components, data structures, and the like, that perform particular tasks or implement particular abstract data types. Typically the functionality of the program modules may be combined or distributed as desired in various embodiments.

Included in FIG. 1 are a computer 12, a network 14, and a server 16. The computer 12 may include a standard, commercially-available computer or a special-purpose computer that may be used to execute one or more program modules. Described in more detail in following paragraphs and figures are program modules that may be executed by the computer 12 in connection with decrypting a received message using the techniques described herein. The computer 12 may operate in a networked environment and communicate with other computers, such as a server 16, as well as others not shown in FIG. 1.

It will be appreciated by those skilled in the art that although the computer 12 is shown in the example as communicating in a networked environment, the computer 12 may communicate with other components utilizing different communication mediums. For example, the computer 12 may communicate with one or more components utilizing a network connection, and/or other type of link known in the art including, but not limited to, the Internet, an intranet, or other wireless and/or hardwired connection(s).

As illustrated in FIG. 1, the computer 12 may include one or more processing units 20, memory 22, storage 30, and a system bus 32 used to facilitate communications between the components of the computer 12, as well as other components not illustrated in FIG. 1.

Depending on the configuration and type of computer 12, memory 22 may be volatile (such as RAM), non-volatile (such as ROM, flash memory, etc.) or some combination of the two. Additionally, the computer 12 may also have additional storage (removable and/or non-removable) including, but not limited to, USB devices, magnetic or optical disks, or tape. Such additional storage is illustrated in FIG. 1 by storage 30. The storage 30 may include one or more removable and non-removable storage devices having associated computer-readable media that may be utilized by the computer 12. The storage 30 in one embodiment may include a hard disk and/or CD-ROM drive. By way of example, and not limitation, memory 22 and storage 30 are examples of computer readable media. Computer readable media includes volatile and non-volatile, removable and non-removable media implemented in any method or technology for storage of information such as computer readable instructions, data structures, program modules or other data. Computer readable media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by the computer 12. The foregoing media typically embodies computer readable instructions, data structures, program modules or other data.

In one embodiment as described herein, the computer 12 may operate in a networked environment as illustrated in FIG. 1 using logical connections to remote computers, such as the server 16, through a network. One or more software modules and/or data files may be included in storage 30 of the computer 12. During operation of the computer 12, one or more of these modules included in the storage 30 may also reside in a portion of memory 22, such as, for example, RAM for controlling the operation of the computer 12.

The server 16 may represent a server computer system connected to the network 14. The server computer system may include software modules to service requests and one or more processors, memory, storage, and the like, similar to that as described herein with respect to the computer 12. As will be described in more detail in following paragraphs, the techniques herein may be used in an embodiment in which the computer 12 and the server 16 may communicate over the network 14. The computer 12 and the server 16 may perform operations in connection with transmitting messages. For example, the server 16 may use a symmetric cryptographic technique and perform an encryption operation to encrypt a message which is then sent to the computer 12. The computer 12 may receive the encrypted message from the server 16 and perform processing in accordance with the techniques herein to decrypt the message. In connection with symmetric cryptographic techniques, the same key (also referred to herein as the symmetric key) is used for encrypting and decrypting a message. Thus, with reference to this example, the sender (the server 16 in this example) of the message uses a key to encrypt the message, and the receiver (the computer 12 in this example) of the message uses the same key to decrypt the message. Symmetric cryptographic techniques may be used by a message receiver to detect message tampering and verify that a received message was sent by a particular sender.

Using the techniques described herein, the computer 12 may decrypt a received message using a key-specific decryption engine which performs decryption without exposing the key during the decryption operation. The key-specific decryption engine does not require access to the key as an input when performing the decryption operation. Rather, as described in following paragraphs, the key-specific decryption engine may be implemented using a set of boolean functions determined in accordance with the particular key. As known in the art, a boolean function (also known as a logical function) may be defined as a function that performs an evaluation, such as evaluation of an expression, and returns a boolean or logical result of true or false indicating the results of the evaluation. The key-specific decryption engine may be characterized as a decryption engine that is customized for the particular key used for the symmetric encryption. An instance of the key-specific decryption engine is generated for each symmetric key. The symmetric key may not be easily determined from the key-specific decryption engine. Rather, the logical functions of the key-specific decryption engine obfuscate the symmetric key so as to complicate attempts to perform reverse-engineering and determine the symmetric key.

In another embodiment also described in following paragraphs, a software module on the computer 12 may use the techniques herein in connection with preventing software piracy. For example, a user may install a software application on the computer 12. In order to activate the installed software application, the user may obtain an identifier. The identifier may be obtained from another computer system. Alternatively, the computer 12 may operate standalone without connectivity to the server 16 and the identifier may be obtained by the user over a phone such as when the user communicates with a live person or automated voice recognition system. The identifier, or portion thereof, may be an encrypted data item. A software module on the computer 12 may perform verification processing each time an attempt it made to execute the software application. The verification processing may include the software module on the computer 12 performing decryption of the identifier, or portion thereof, using the techniques herein. As such, the techniques herein may prevent use of false identifiers as may be generated in connection with software piracy. False identifiers may be generated in order to activate unauthorized or unlicensed copies of the software application. This is described in more detail herein.

The foregoing are just two examples illustrating use of the techniques herein. It will be appreciated by those skilled in the art that the techniques herein may more generally be used in connection with communications transmitted from any sender to any receiver on the same or different computer systems.

Figure 2:
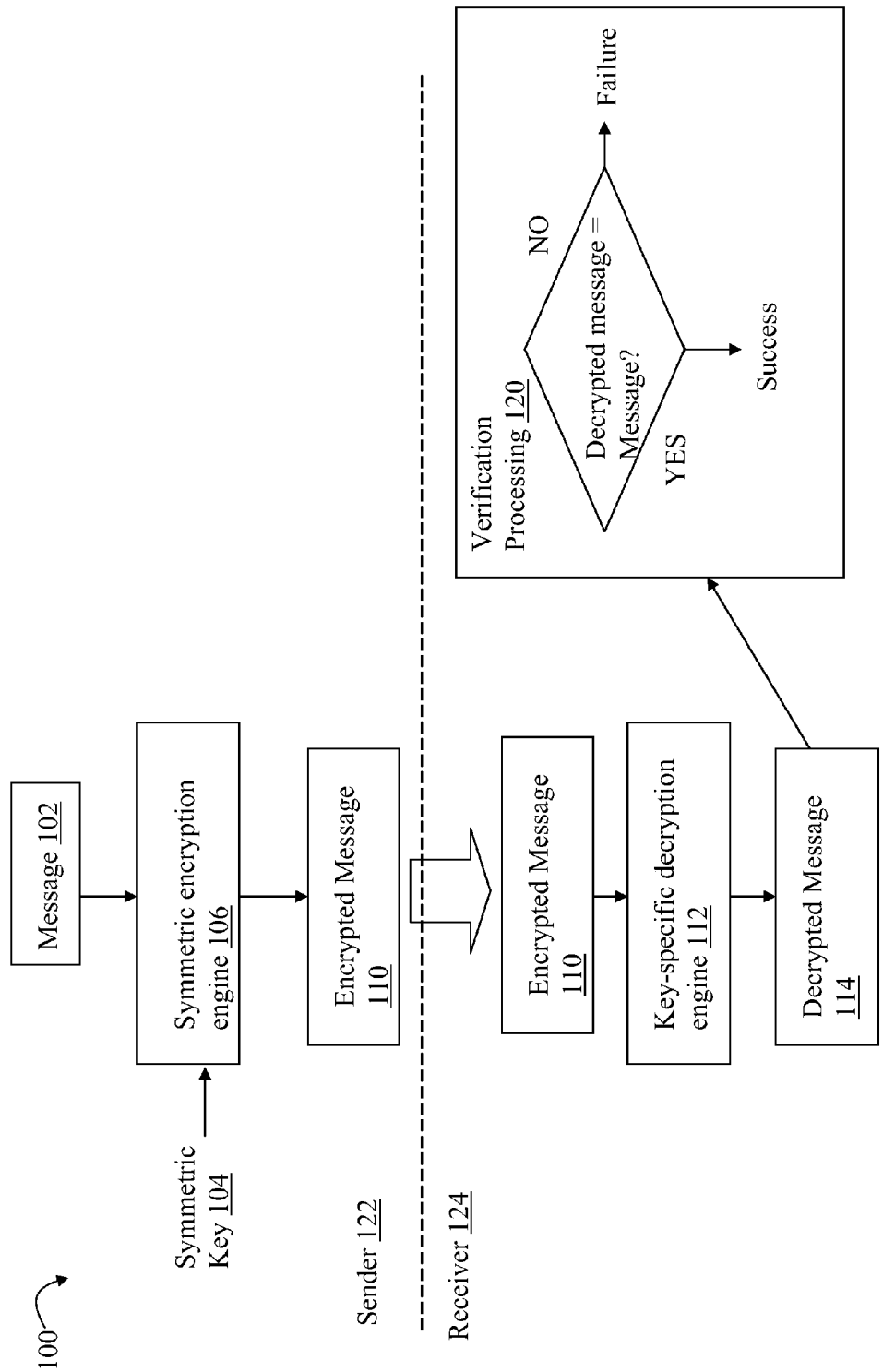
FIG. 2 is an example of components that may be included in an embodiment and used in connection with performing the techniques herein.

Referring to FIG. 2, shown is an example illustrating components that may be used in an embodiment in connection with performing the techniques described herein. The example 100 of FIG. 2 includes a sender 122 and receiver 124. The sender 122 uses a symmetric encryption engine 106 to perform an encryption operation using a symmetric cryptographic technique which encrypts a message 102 using a symmetric key 104. The symmetric key 104 is a key used in connection with performing symmetric encryption by the sender 122 to generate an encrypted message 110. The symmetric key 104 is symmetric with respect to its use when performing cryptographic operations of encryption and decryption in that the same key 104 is used in connection with both encryption and decryption of a message. The symmetric encryption engine 106 may use any symmetric cryptographic technique, such as an implementation of the Advanced Encryption Standard (AES). The symmetric encryption engine 106 may be as used in connection with performing an encryption operation in an existing implementation of a selected symmetric cryptographic technique, such as an existing implementation of AES, implemented using executable computer instructions that process inputs including the symmetric key 104 and message 102 to be encrypted. Thus, the symmetric encryption engine 106 uses the symmetric key 104 as an input.

In connection with examples herein, reference may be made for purposes of illustration to an encrypted message 110 where the entire message transmitted may be encrypted. It will be appreciated by those skilled in the art that the techniques herein may also be used in connection with an embodiment in which a portion of a transmitted message may be encrypted and accordingly decrypted.

Once the sender has generated the encrypted message 110, the encrypted message 110 is transmitted to the receiver 124. The receiver 124 then decrypts the received encrypted message 110 using a key-specific decryption engine 112 to generate decrypted message 114. Techniques that may be used to generate the key-specific decryption engine 112 are described in more detail herein. In accordance with an embodiment utilizing the techniques described herein, the key-specific decryption engine 112 is used rather than a decryption engine as may be otherwise utilized in an existing implementation of the selected symmetric cryptographic technique. A decryption engine as used in an existing implementation of the selected symmetric cryptographic technique may be implemented using executable computer instructions that process inputs including the symmetric key 104 and encrypted message 110 to be decrypted. Thus, as with the encryption engine 106, the symmetric key is used as an input and may be obtained, for example, from a storage location on the computer. In accordance with an embodiment using the techniques herein, the key-specific decryption engine 112 that performs a decryption operation for the selected symmetric cryptographic technique may also be implemented using executable computer instructions that process inputs. However, the inputs to the key-specific decryption engine 112 include the encrypted message 110 but not the symmetric key.

The decrypted message 114 may be used as an input for verification processing 120. For example, verification processing 120 may determine whether the decrypted message 120 matches a copy of the original message 102 as may be stored locally or otherwise obtained by the receiver. If the decrypted message 120 matches a copy of the original message 102, verification processing is successful indicating that the received encrypted message has not been tampered with and has been sent by the sender 122. Otherwise, verification processing fails. It should be noted that any one of a variety of different techniques may be used for performing verification processing. As another example, the sender may send a message including a first portion of unencrypted data and a second portion. The second portion may be the result of encrypting the first portion using the symmetric encryption engine 106 with symmetric key 104. The receiver 124 may receive the message including the first and second portions and decrypt the second portion using the key-specific decryption engine 112 to generate a result. The receiver may then perform verification processing by determining whether the result of the decryption matches the first portion of the received message.

The key-specific decryption engine will now be described in more detail as well as exemplary ways in which the key-specific decryption engine may be constructed.

Figure 3:
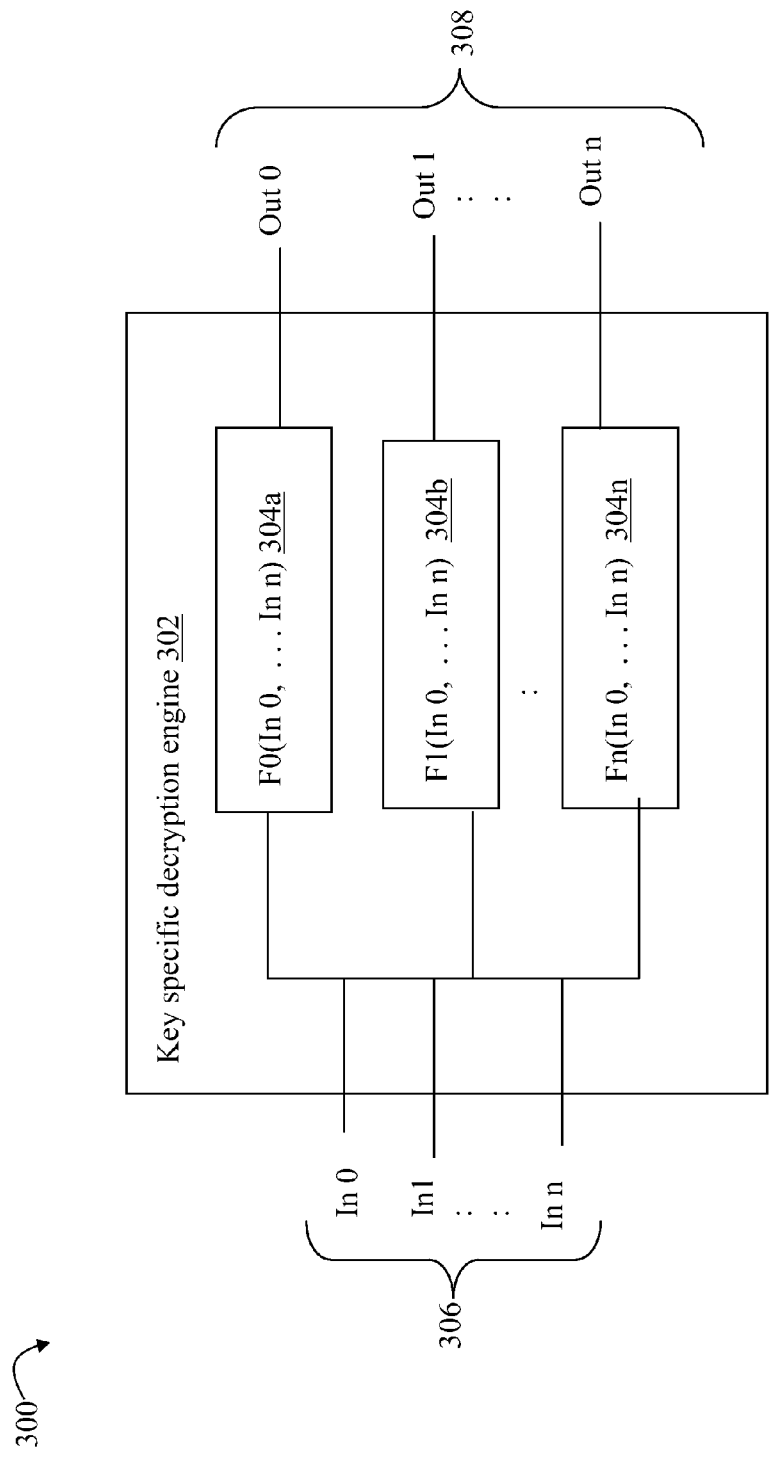
FIG. 3 is another example illustrating an embodiment of a key-specific decryption engine used in connection with performing the techniques herein.

Referring to FIG. 3, shown is an example representation of a key-specific decryption engine as may be used in an embodiment in connection with the techniques herein. As described above, the key-specific decryption engine 302 may be implemented as a set of boolean or logical functions 304a-304n generated in order to implement decryption using the symmetric key. The input 306 is an encrypted message and the output 308 is a decrypted message. As illustrated, each of the boolean functions 304a-304n may determine one bit of the output 308 using multiple bits of the input 308. In this example, each of the functions 304a-304n determine a single bit of the output based on all bits of the input 306.

The key-specific decryption engine 302 may be implemented using software that implements the boolean functions generating the desired output 308 for a given input 306 in accordance with the particular symmetric cryptographic technique selected for use in an embodiment.

The boolean functions 304a-304n may perform one or more logical operation, such as AND, OR, NOT, XOR, or some combination of the foregoing.

Figure 4:
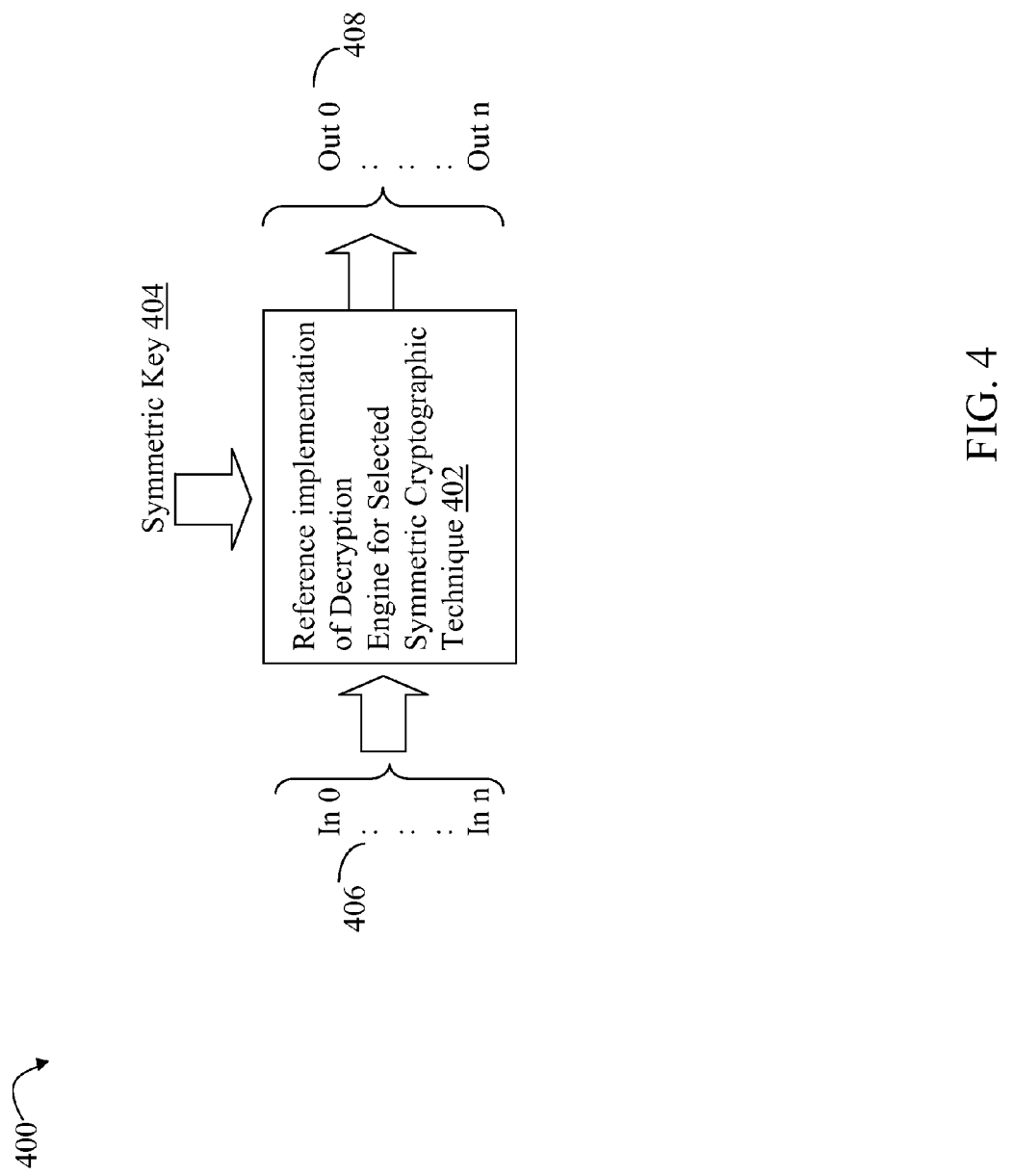
FIG. 4 is an example illustrating a reference implementation of a decryption engine for a selected symmetric cryptographic technique that uses a symmetric key as an input.

With reference to FIG. 4, the boolean functions 304a-304n of FIG. 3 may be determined by evaluating truth tables for each output bit having values determined using a reference implementation 402 of the decryption engine for the selected symmetric cryptographic technique. The reference implementation 402 refers to an instance of decryption engine as may be utilized in an existing implementation of the selected symmetric cryptographic technique that processes inputs including the symmetric key 404 and encrypted message 406 to be decrypted to generate a decrypted message 408 as the output. Using the reference implementation 402, the expected values of the output 408 may be determined for different combinations of input values 406 for the symmetric key 404. The boolean functions may be determined which map each possible combination of values for the input 406 to an expected value of the output 408.

To illustrate how the boolean functions may be determined, a simplified example is selected as will be described in following paragraphs using an input 406 and an output 408 which is 2 bits in length.

Figure 5:
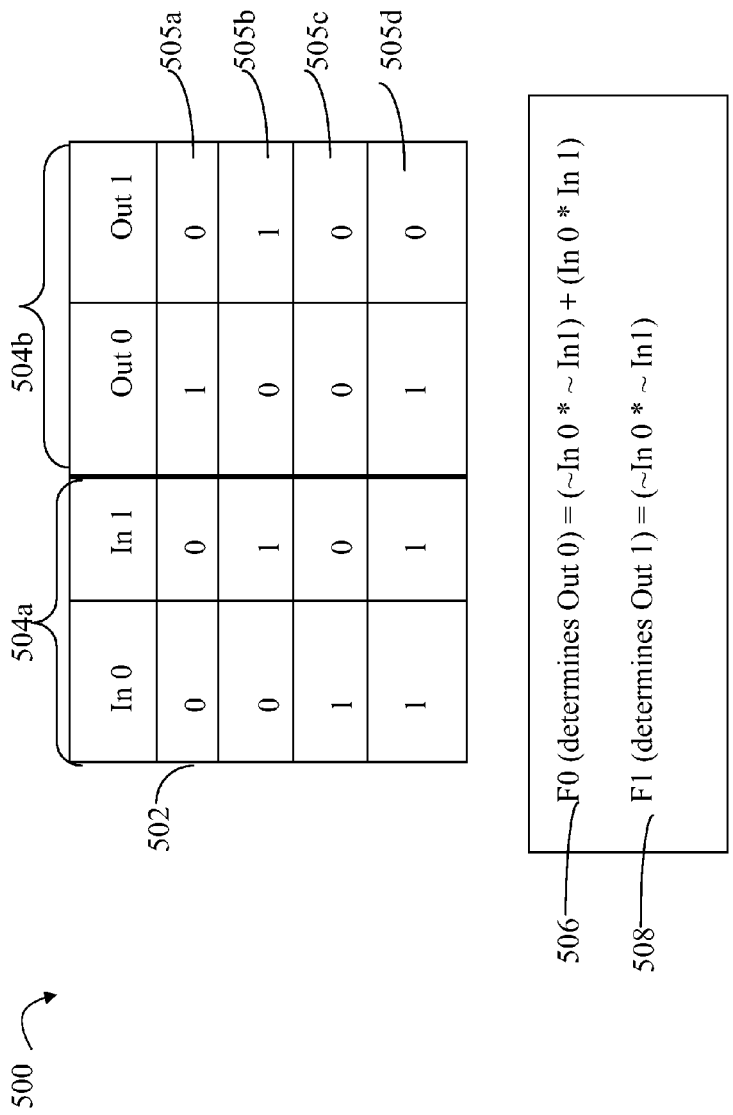
FIGS. 5-10 are examples illustrating techniques that may be used in determining the boolean functions of the key-specific decryption engine.

Referring to FIG. 5, shown is an example 500 illustrating use of truth tables in connection with determining the boolean functions of the key-specific decryption engine. The truth table 502 enumerates the different possible input values 504a and expected output values 504b. The values of 504b may be generated by running the reference implementation 402 as illustrated in FIG. 4 for each combination of input values in 504a for the specific symmetric key. The output values generated by the reference implementation 402 may be recorded in 504b. Based on the truth table 502, a set of one or more boolean functions can be determined for each bit of the output in a canonical form. All logical functions are expressible in canonical form as a sum of products (SOP) and a product of sums (POS). The SOP is also known as disjunctive (OR) normal form of minterms. The POS of a function, a logical equivalent of the SOP of the function, is also known as the conjunction (AND) of maxterms. For a boolean function of n variables In 0, . . . , In n, a product term in which each of the n variables appears once, either complemented (e.g., negated)

or uncomplemented, is called a minterm. Thus, a minterm is a logical expression of n variables consisting of the logical conjunction (AND) operator and the complement (NOT) operator. A maxterm is a logical expression of n variables consisting of the logical disjunction (OR) operator and the complement (NOT) operator.

With reference to FIG. 5 and others herein, the logical NOT operation may be denoted by the "~" operator, the logical OR operator may be denoted by "+", and the logical AND operator may be denoted by "*".

In accordance with the techniques herein, the truth table 502 may be examined and the SOP or POS determined for each bit of the output. The SOP or POS determined for a bit of the output may represent the boolean function included in the key-specific decryption engine which determines the bit of the output. For purposes of illustration, the SOP is used in this example.

Element 506 represents a first boolean function F0 which determines Out 0, bit 0 of the output. Element 506 may be determined by examining truth table lines 505a and 505d where the output Out 0 is 1 or true. For each such line in the truth table, a minterm is determined. Line 505a may be represented as the minterm (~In 0*~In1), and line 505d may be represented as minterm (In 0*In 1). The SOP is the logical OR of the foregoing minterms as represented in 506. Element 508 represents a second boolean function F1 which determines Out 1, bit 1 of the output. Element 508 may be determined by examining truth table line 505b where output Out 1 is 1 or true. Line 505b may be represented as the minterm (~In 0*~In1) as included in element 508.

The boolean function F0 may be implemented as represented in 506 and the boolean function F1 may be implemented as represented in 508 in the key-specific decryption engine as may be used by a receiver of a message as described herein. The foregoing process may be performed for each symmetric key to determine a customized key-specific decryption engine for that particular symmetric key.

It should be noted that once an initial boolean function as just described is determined, the initial boolean function may be further transformed to determine a logical equivalent but more complex boolean function which yields the expected output. For example, a logical operation in a boolean function of A OR B may be implemented as NOT (NOT(A) AND NOT(B)) in accordance with DeMorgan's rules.

For example, rather than implement function F0 as (~In 0*~In1)+(In 0*In 1), F0 may be further transformed in accordance with DeMorgan's rule where NOT (A AND B)=(NOT A) OR (NOT B), and where A=(~In 0*~In1) and B=(In 0*In 1), so that F0 is implemented as (In 0+In1)*(~In 0+~In 1). A further transformation or permutation may be applied in accordance with another logical equivalence of boolean algebra where A=NOT (NOT A) so that for each of the inputs In 0 and In 1, ~(~In 0) and ~(~In1), respectively may be substituted and used in implementing the function F0. Different transformations may be applied to each function. For example, an embodiment may determine one of the boolean functions as a SOP and another of the boolean functions using POS. Such variations and transformations may be used to increase the difficulty in deriving the key through reverse engineering of the key-specific decryption engine.

Figure 6:
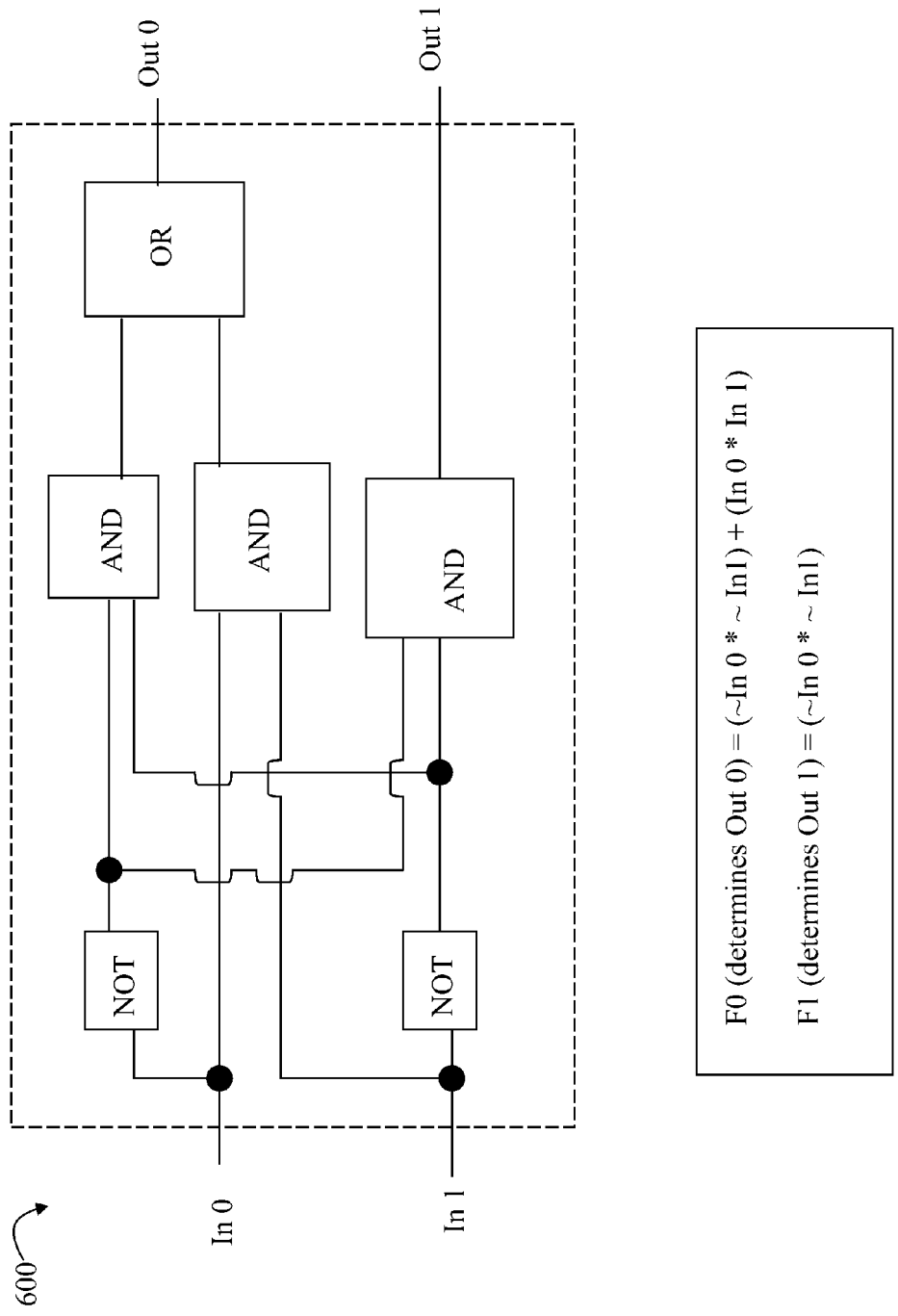

Referring to FIG. 6, shown is another representation of the boolean functions F0 and F1 as may be implemented in the key-specific decryption engine using 506 and 508 of FIG. 5. The boolean functions F0 and F1 may be implemented by coding in software. It should also be noted that the boolean functions may also be implemented, in whole or in part, using digital circuits, field programmable gate arrays, and the like.

The processing just described involving the use of truth tables to determine the boolean functions may be performed in an automated fashion using software. Although the foregoing technique may be used to determine the boolean functions, its usage may be practically limited in accordance with the available resources of the computer system utilized. In connection with generating truth tables for each output based on all the inputs as described above, each truth table has a size of $2**n$ possible input combinations. If the number of input bits is less than a threshold number, for example, less than or equal to 32, the foregoing technique may be used so that there is one boolean function for each output bit in which the boolean function uses all bits if the input. The threshold selected may be determined based on resources of the computer system such as, for example, processing speed and/or storage limitations.

As another example, an embodiment may use an implementation of AES as the symmetric cryptographic technique which operates on block sizes of 128 bits. Thus the key-specific decryption engine 302 implementing AES has an input (encrypted message) and output (decrypted message) which are each 128 bits in length. In connection with this example, implementing the key-specific decryption engine using 128 boolean functions each having 128 inputs and 1 output may not be feasible since the truth table used to generate the boolean functions includes $2**128$ entries for the possible input combinations. Thus, an embodiment may use an alternative partitioning technique in connection with implementation of the key-specific decryption engine. In comparison to the foregoing, the key-specific decryption engine may be implemented using a larger number of boolean functions each using a lesser number of inputs by partitioning the decryption processing into groups of boolean functions where the outputs of one partition are inputs to a subsequent partition. Each of the boolean functions may then be implemented using the technique described above using truth tables, for example, as illustrated in FIG. 5. It should be noted that how this partitioning may be performed is determined in accordance with the processing steps and the dependencies between the inputs and the outputs at various processing points for the selected symmetric cryptographic technique.

Figure 7:
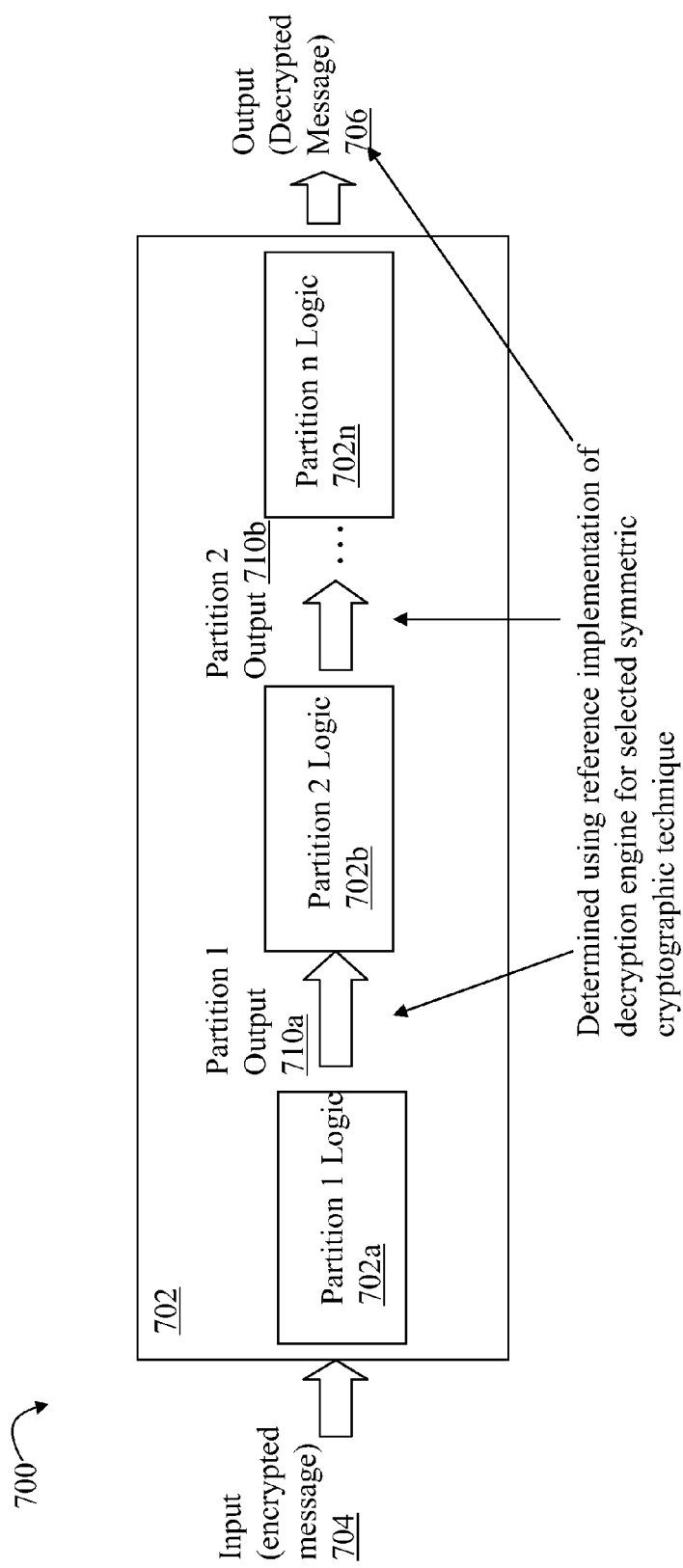

Referring to FIG. 7, shown is an illustration of the alternative partitioning technique for determining the boolean functions of a key-specific decryption engine 702. In the example 700, the processing of a decryption operation for the selected symmetric cryptographic technique used in an embodiment may be divided into multiple partitions 702a-702n. Each partition may correspond to a group of boolean functions producing an intermediate result or output of that partition. With reference to the example 700, the output of partition 1 is denoted as partition 1 output 710a, the output of partition 2 is denoted as partition 2 output 710b, and so on. The output of the last partition, partition n, is the decrypted message 706. The output of one partition is used as an input to the next partition. The reference implementation for the selected symmetric cryptographic technique may be used to determine the intermediate results or partition outputs.

Figure 8:
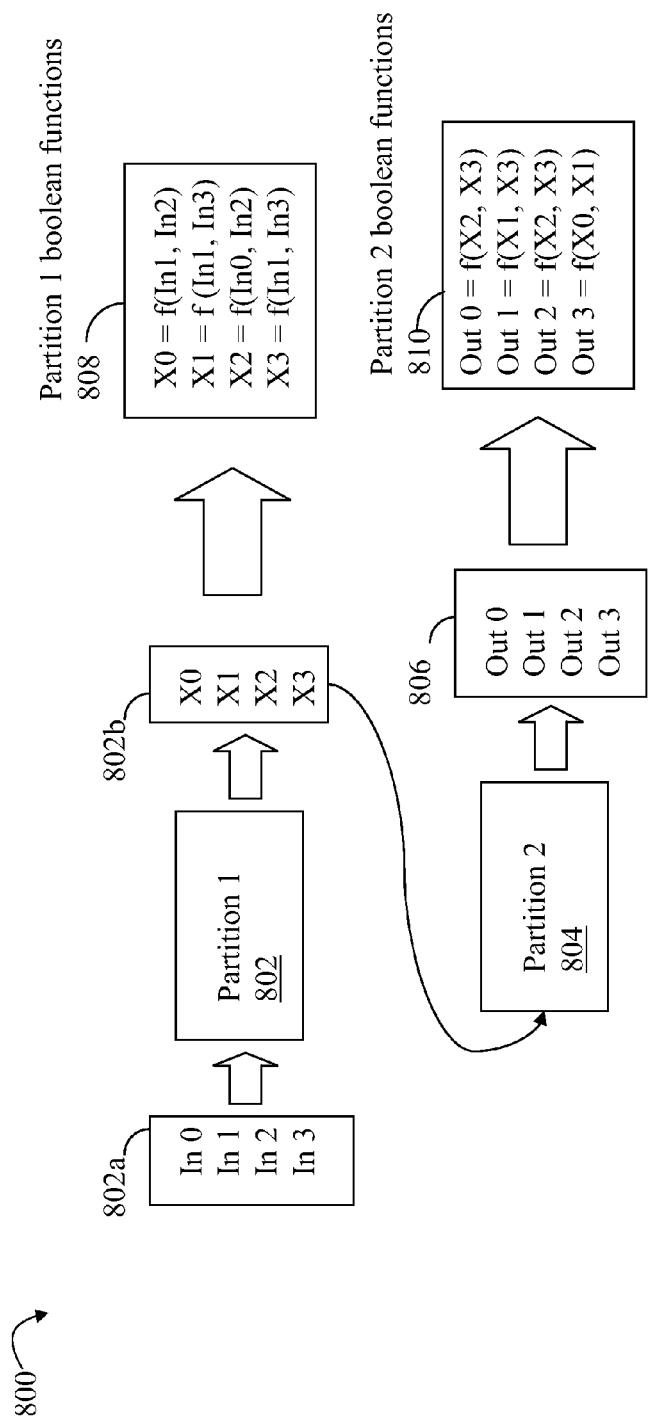

What will now be described are examples illustrating the partitioning technique. As a first example, an illustration will be made with respect to a hypothetical decryption operation for a symmetric cryptographic technique which uses a 4 bit input that is an encrypted message and generates a decrypted message as a 4 bit output. If the key-specific decryption engine is implemented using 4 logical functions each using all 4 input bits to determine one of the bits of the output, a truth table having 16 entries (e.g., $2**4$) may be used. Alternatively, the partitioning technique may be used to partition the decryption processing so that each partition generates intermediate results as described in connection with FIG. 7. To further illustrate, reference is made to FIG. 8. With respect to the hypothetical decryption operation, suppose that the decryption processing is performed in two iterations of processing steps so that two partitions 802 and 804 are determined. Each partition corresponds to one of the processing iterations. The encrypted message 802a is input to partition 1 802 which generates intermediate result 802b. As described elsewhere herein, 802b may be determined using a reference implementation for the hypothetical decryption operation using a symmetric key. The intermediate result 802b which is generated as partition 1 output is used as an input to the second partition processing 804. Partition 804 generates output 806 which corresponds to the decrypted message.

Element 808 represents a first set of four boolean functions as may be determined for the first partition 802 in accordance with the particulars of the processing for the hypothetical decryption such as dependencies between inputs and outputs of the partition 802. Element 808 indicates that each bit of the intermediate result 802b can be determined as a function of 2 bits of the input. To determine each boolean function for the partition 802, a truth table may be created including entries for the different combinations of the 2 inputs. For example, intermediate result bit X0 is determined by creating a truth table based on inputs In1 and In2, intermediate result bit X1 is determined by creating a truth table based on inputs In1 and In3, and so on. Element 808 represents a first set of four boolean functions as may be determined for the first partition 802 in accordance with the particulars of the hypothetical technique such as dependencies between inputs and outputs of the partition 802. Similarly, element 810 indicates that each bit of the output 806 can be determined as a function of 2 bits of the intermediate result or partition 1 output 802b. To determine each boolean function of partition 804, a truth table may be created including entries for the different combinations for the two bits of 802b indicated in 810. For example, Out 0 is determined by creating a truth table based on bits X2 and X3 of the intermediate result, Out 1 is determined by creating a truth table based on bits X1 and X3 of the intermediate result, and so on.

For this particular decryption operation illustrated, the above described partitioning and mapping of partition inputs to outputs may be possible so that the key-specific decryption engine may be implemented using a total of 8 functions, 4 functions per partition.

The further illustrate, another example will now be described in connection with the AES symmetric cryptographic technique using a symmetric key size of 128 bits. AES operates on a fixed size input of an encrypted message of 128 bits. The AES decryption process is implemented using cryptographic rounds or iterations referred to herein as a round. Each round consists of a series of steps or stages which operate on a 4×4 array of 8-bit bytes. Using a symmetric key size of 128 bits, the AES decryption processing performs 11 rounds of processing. If a different key size is used, such as 256 bits as allowed by the particular AES implementation, additional processing rounds may be performed.

AES is described, for example, in Federal Information Processing Standards Publication 197 (FIPS-197), dated Nov. 26, 2001. Although reference is made herein to particular aspects of the well-known AES cryptographic technique for purposes of further illustration of the partitioning techniques herein, it will be appreciated by those skilled in the art that the partitioning technique may be applied for use in connection with other cryptographic techniques also including rounds such other block cipher techniques.

Figure 9:
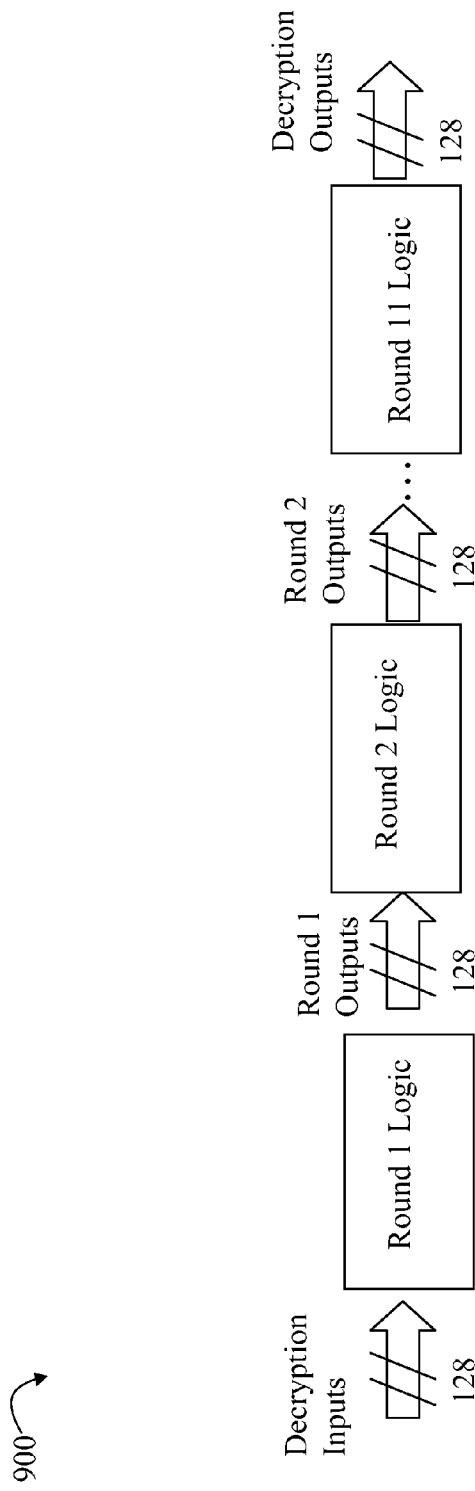

AES may be characterized as a block cipher using a symmetric key which operates on fixed length groups of bits also referred to as blocks. In accordance with the partitioning technique, each round of the decryption process may correspond to a partition as illustrated in FIG. 9. The example 900 illustrates the 11 rounds of decryption processing for AES using a symmetric key size of 128 bits in which the output of round 1 is an input to round 2, the output of round 2 is an input to round 3, and so on, until the output of round 11 is the decrypted output. Groups of boolean functions may be determined for each round for the particular 128 bit symmetric key. Each round may perform the same decryption processing. In connection with AES, each round may consist of the same 4 stages or steps. Each stage of the decryption processing within each round of AES involves performing operations on a single byte or 8 bits of data included in the 4×4 array at a time. Thus, the key-specific decryption engine may be implemented using boolean functions, each boolean function having an 8 bit input to determine 1 output bit.

Figure 10:
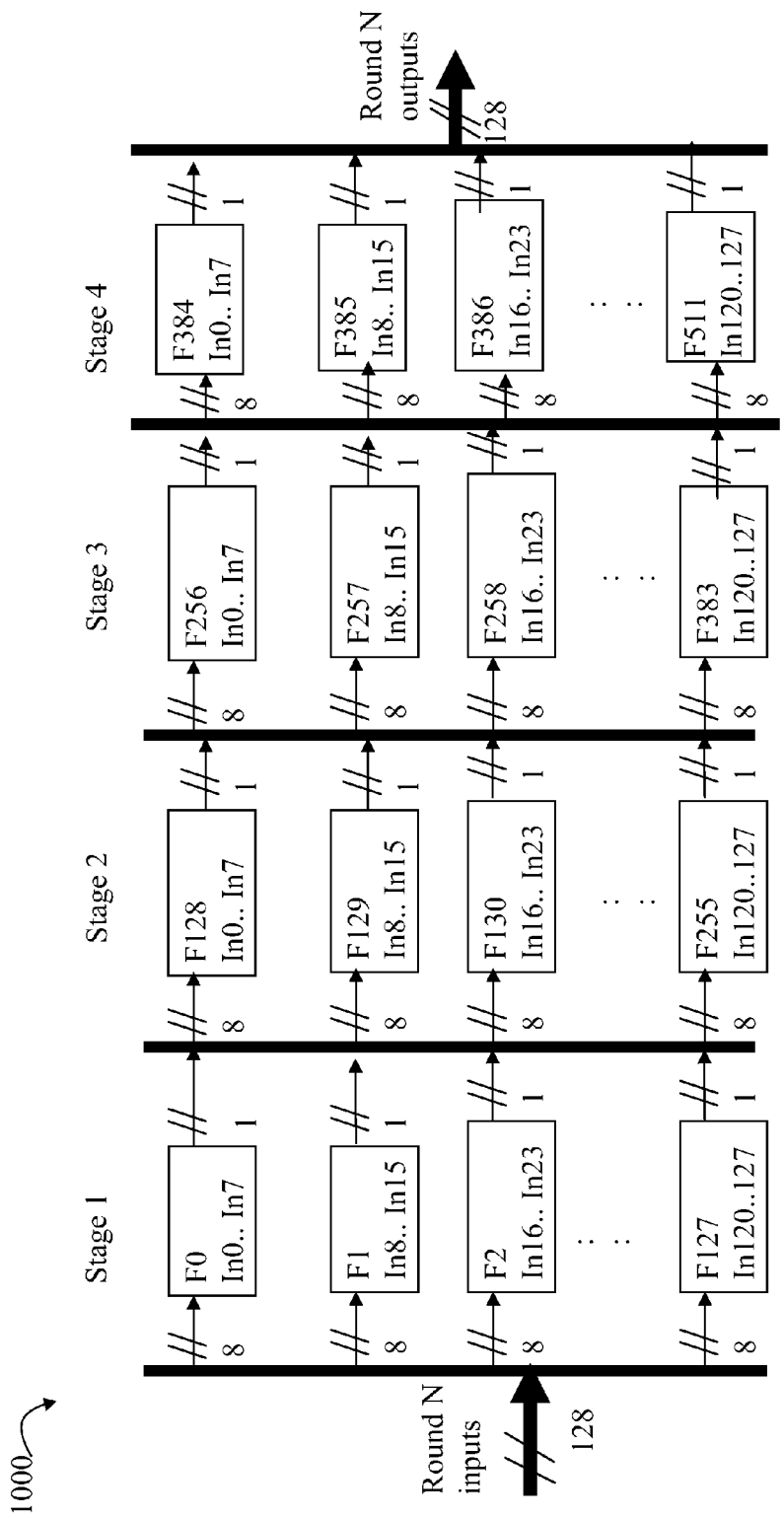

Referring to FIG. 10, shown is an example illustrating processing as may be performed in single round of an embodiment. The example 100 illustrates a round that consists of 4 stages or steps such as when performing the decryption operation for the AES cryptographic technique. More generally, depending on the cryptographic technique, a round of the decryption operation may include a different number of stages or steps than as illustrated and may operate on a different number of input bits other than 128 per stage and other than 8 bits per boolean function as illustrated. The key-specific decryption engine may be implemented using boolean functions accordingly determined for the number of stages, inputs and outputs of each stage, round, and the like.

The processing performed in each stage, as well as the number of stages and associated inputs and outputs, vary with each symmetric cryptographic technique. For example, in connection with AES, stage 1 includes performing a substitution step where each 8 bits of input to stage 1 are replaced with another 8 bits in accordance with a lookup table, stage 2 may include a transposition step where bytes of each row of the 4×4 array are shifted cyclically a specified number of times, and so on, in accordance with the particulars of the AES decryption processing.

As just described, the partitions may be determined based on cryptographic rounds. The boolean functions for each round may be determined in accordance with a number of stages or steps in each round and particulars related to the inputs and outputs used in performing processing for each stage. Truth tables may then be used to determine the boolean functions using a reference implementation of the decryption engine for the particular cryptographic technique as described above. As an example illustration using AES with a 128 bit symmetric key, decryption processing may be partitioned in accordance with the 11 rounds in which each round includes 4 stages. Because decryption processing of AES performs operations on 8 bit portions as described above, boolean functions may be implemented for each stage in which each function determines one bit of output for the stage based on 8 bits of input to the stage. It should be noted that decryption processing for another cryptographic technique may operate on a different number of bits and the boolean functions may be determined accordingly. As illustrated in FIG. 10 in connection with performing decryption for AES based on a 128 bit symmetric key, each stage of a round may be implemented using 128 boolean functions, with each function having 8 input bits and 1 output bit resulting in 512 boolean functions to implement each round. Thus, a total of 5632 boolean functions may be used in implementing each key-specific decryption engine when using AES based on a 128 bit symmetric key. It should be noted that in this example, the truth table used in determining each boolean function includes 2**8 entries which may be easily stored in computer memory for use connection with the techniques herein.

Figure 11:
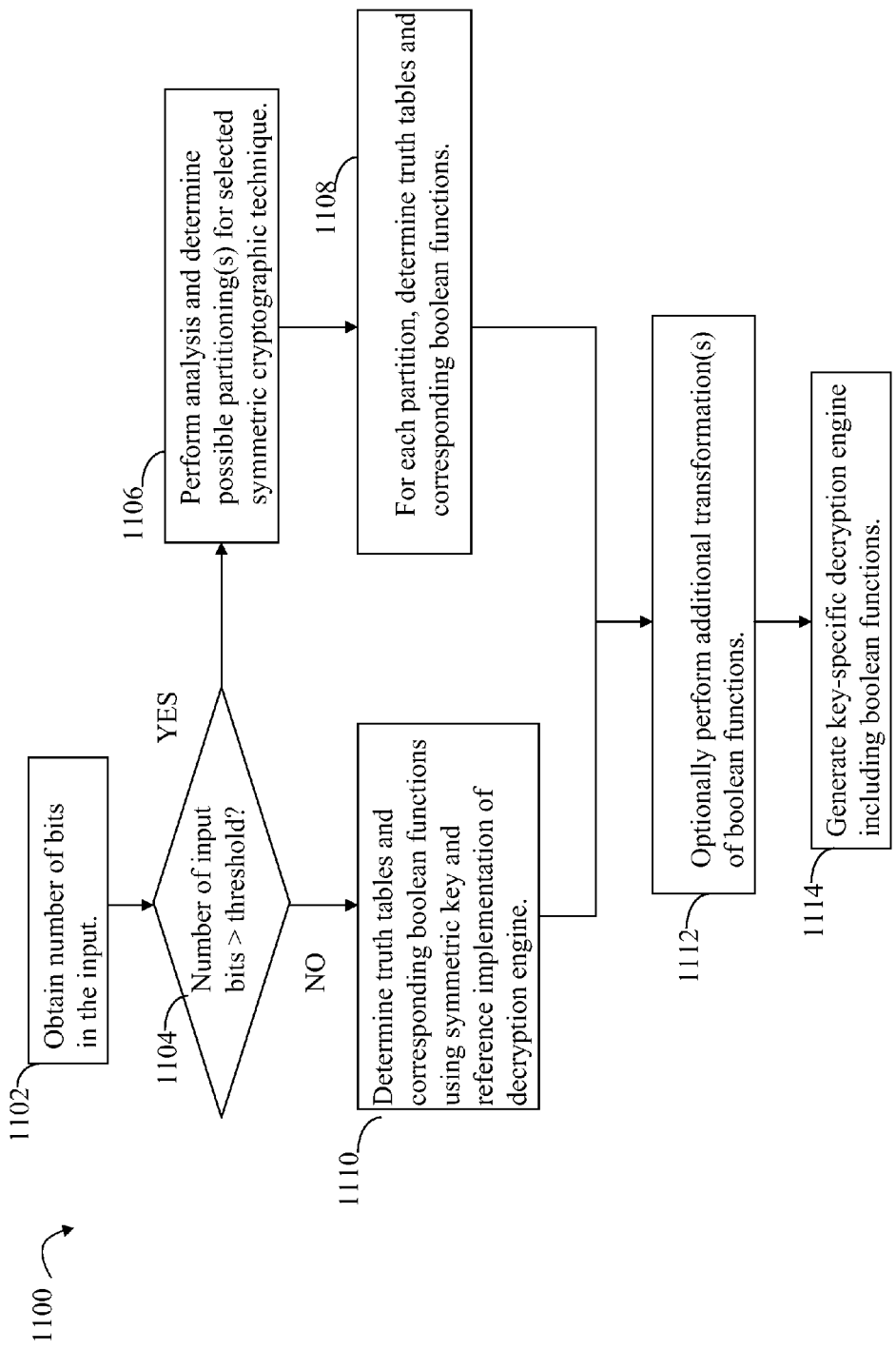
FIGS. 11, 12A, 12B and 13 are flowcharts of processing steps that may be performed in an embodiment using the techniques herein.

Referring to FIG. 11, shown is a flowchart of processing steps that may be performed in an embodiment in connection with generating a key-specific decryption engine in accordance with the techniques herein. The key-specific decryption engine may be implemented using boolean functions and does not require input of the symmetric key. The steps of flowchart 1100 may be performed to generate the key-specific decryption engine for a symmetric cryptographic technique. The key-specific decryption engine may then be provided to a receiver and used, for example, as illustrated in connection with FIG. 2. Flowchart 1100 summarizes processing as described above. At step 1102, the number of bits in the input is obtained. At step 1104, a determination is made as to whether the number of bits of the input exceed a threshold value. As described above, the threshold value may be selected in accordance with resources of the particular computer system upon which processing is being performed since the number of bits of the input affect the size of the truth tables used to determine the boolean functions. If step 1104 evaluates to no, control proceeds to step 1110 where the truth tables and corresponding boolean functions are determined using the reference implementation of the decryption engine and the symmetric key. Control proceeds to step 1112 to optionally perform additional transformations of the boolean functions determined at step 1110. As described above, the additional transformations may be performed to make it more difficult to determine the symmetric key by reverse engineering of the key-specific decryption engine. At step 1114, the key-specific decryption engine may be generated. The key-specific decryption engine may be implemented, such as by coding the boolean functions determined as a result of steps 1110 and 1112. If step 1104 evaluates to yes, control proceeds to step 1106 where analysis is performed with respect to the decryption process for the selected symmetric cryptographic technique used in an embodiment to determine possible partitioning(s). As described above, the partitions determined vary with the selected symmetric cryptographic technique. Different characteristics of the decryption operation for the selected symmetric cryptographic technique may be used in determining how to form the partitions. For example, cryptographic rounds may be used so that each round corresponds to a partition. At step 1108, the truth tables and boolean functions for each partition are determined. As described herein, a partition may also be further divided into sub-partitions such as corresponding to stages or steps of a round as described above. From step 1108, control proceeds to steps 1112 and 1114 described above.

It should be noted that although truth tables are described and used herein in determining the boolean functions, an embodiment may use other representations and techniques to determine the boolean functions.

What will now be described is another exemplary use of techniques herein. As mentioned above, an identifier may be obtained in connection with activating installed software on a computer system. In connection with following paragraphs, the identifier obtained as part of the software activation is referred to as a confirmation identifier. A portion of the software activation process is summarized in flowchart 1200 of FIG. 12A where the activation server may be contacted in step 1202 and a confirmation identifier obtained in step 1204. The confirmation identifier may be a message encrypted with a symmetric key or may otherwise include an encrypted data portion. The confirmation identifier may be obtained, for example, over a phone by a user contacting a customer representative or automated voice recognition system which obtains the confirmation identifier from a computer system referred to as the activation server. The confirmation identifier may include an encrypted portion formed using original data derived using any one of a variety of different techniques. For purposes of illustration, the confirmation identifier may be obtained using phone activation such as when activation is performed and the computer including the installed software does not have network connectivity. Alternatively, activation of the installed software may also be performed using an online activation method where the user computer communicates with another computer system over a network to obtain other information used in connection with software activation. In connection with this example, the confirmation identifier may be obtained when phone activation is performed and not when the online activation is performed. In step 1206, the user may enter the confirmation identifier using an interface so that the confirmation identifier is stored on the computer including the installed software.

Figure 12:
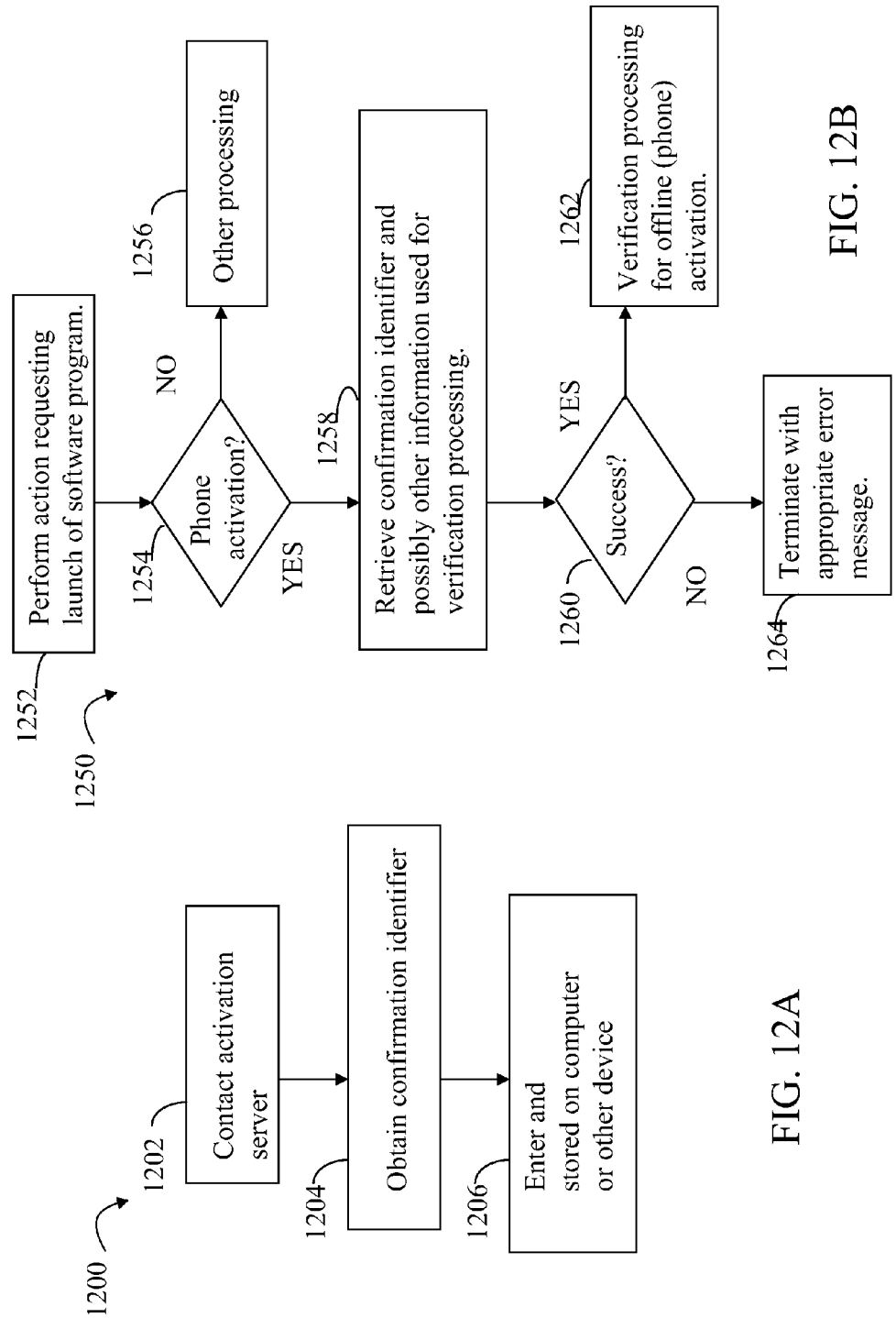

A software module on the computer system may use the confirmation identifier to perform verification processing each time an attempt is made to launch the installed software. The flowchart 1250 of FIG. 12B summarizes processing that may be performed as part of commencing execution of a software program in response to an attempt to launch the installed software. At step 1252, a user may perform an action, such as by selecting an application for execution using a mouse or other input device, requesting to launch a software program. At step 1254, a determination is made as to whether the installed software was activated using phone activation or some other activation method such as the online activation method. If the phone activation method was previously performed, step 1254 evaluates to yes and control proceeds to step 1258 to retrieve the confirmation identifier previously stored on the computer. Step 1258 may also include retrieving other information as may be used in an embodiment in connection with performing verification processing. At step 1250, a determination is made as to whether the confirmation identifier and other information are successfully retrieved. If not, control proceeds to step 1264 where processing terminates. If step 1260 evaluates to yes, control proceeds to step 1262 to perform verification processing in accordance with the phone activation method. Processing of step 1262 is described in more detail below and uses the confirmation identifier. If the phone activation method was not previously performed, step 1254 evaluates to no and other verification processing is performed for the particular activation method used and information previously obtained. Other activation methods may result in different information besides the confirmation identifier being obtained and subsequently used in connection with an attempt to launch a software program.

Figure 13:
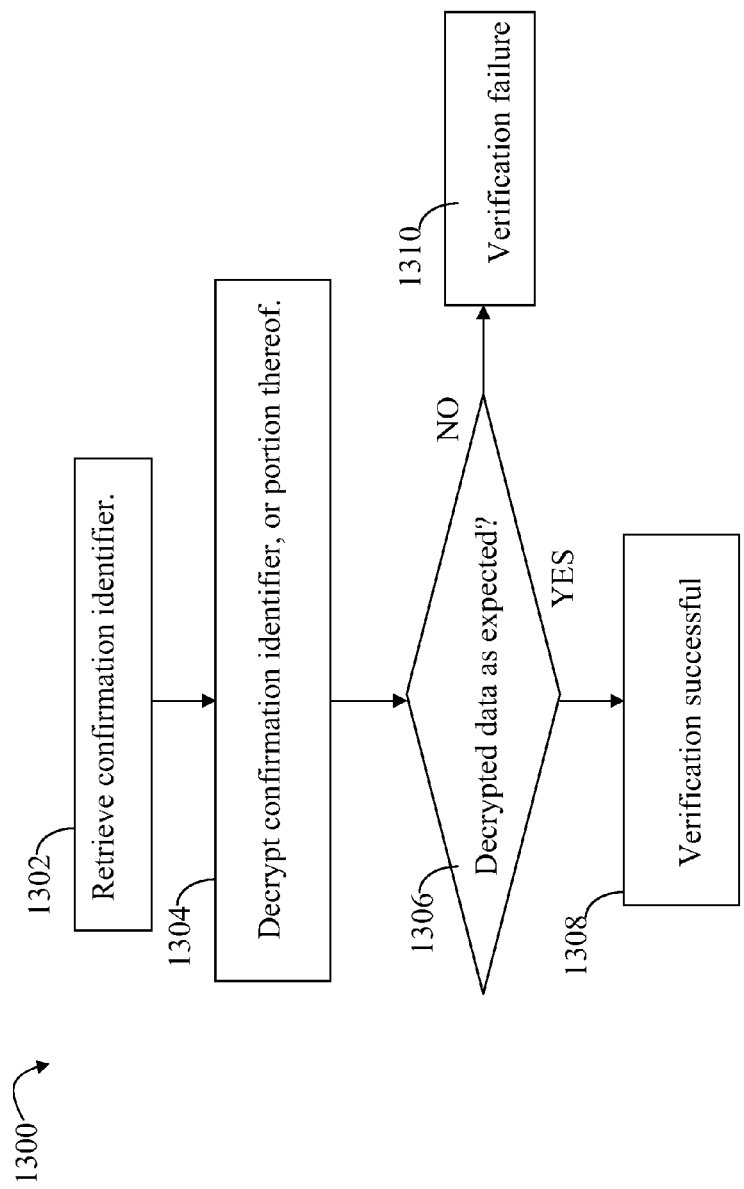

Referring to FIG. 13, shown is a flowchart of processing steps that may be performed in an embodiment in connection with verification processing when phone activation was previously performed and a confirmation identifier obtained. The processing steps of the flowchart 1300 may be performed alone or in conjunction with other processing as part of verification processing to determine whether to allow execution of installed software to proceed. The flowchart 1300 describes steps that may be performed in connection with step 1262 of FIG. 12B. At step 1302, the confirmation identifier is retrieved. Step 1302 may include reading the previously stored confirmation identifier obtained as a result of phone activation processing. At step 1304, the confirmation identifier, or an encrypted portion thereof, is decrypted. At step 1306 processing is performed to determine whether the decrypted data obtained as a result of performing step 1304 is the same as a copy of the original data. As described herein, the copy of the original data may be, for example, stored locally on the user computer and retrieved for purposes of performing processing of flowchart 1300. If step 1306 evaluates to no, control proceeds to step 1310 where verification processing fails. If step 1306 evaluates to yes, control proceeds to step 1308 where verification processing succeeds. It should be noted that from step 1308, verification processing may continue and a successful result for verification processing may depend on results of steps performed subsequent to step 1308. Step 1304 may be performed using the key-specific decryption engine as described herein.

Software piracy may include, for example, obtaining an illegal copy of the software and generating a fake confirmation identifier. An embodiment such as described, for example, in connection with FIGS. 12A, 12b and 13, may use the techniques herein making it difficult to obtain the symmetric key used to generate fake confirmation identifiers so that illegal copies of the software may be activated.

When performing phone activation as opposed to other software activation methods such as online activation, there may be a practical limit on the size of the confirmation identifier used due to the fact that a user obtains the confirmation identifier over the phone and may then manually enter the confirmation identifier. Using the key-specific decryption engine provides for detecting message tampering and verifying authentication of a valid confirmation identifier without incurring the increased message size as may be occur when using other techniques such as digital signatures. Furthermore, there is no additional overhead in terms of increased size of an encrypted message as may be the case using other techniques, such as digital signatures.

It should be noted that although phone activation is referred to herein, phone activation may be more generally referred to as one type of offline activation processing that may be performed in an embodiment in which the confirmation identifier may be obtained. Offline activation may generally refer to an activation method used when the computer system including the installed software does not communicate with another computer system to activate the installed software. Rather, the activation processing may be performed while the computer system including the installed software is offline without connectivity to a network, other computer system, and the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for generating a key-specific decryption engine, the method comprising:
   providing, to a sending computer, a reference implementation of a decryption engine configured to perform a decryption operation of a symmetric cryptographic technique, the reference implementation of the decryption engine configured to accept a symmetric key as a first input and an encrypted message as a second input, wherein the encrypted message is an encrypted version of an original message that was previously encrypted using the symmetric key;
   determining, by the sending computer using the reference implementation, expected outputs corresponding to different values specified for the second input, wherein the expected outputs include the original message that corresponds to the encrypted message as a corresponding one of the different values;
   determining, by the sending computer, one or more boolean functions configured for generating the expected outputs including the original message based on the symmetric key as the first input and the different values including the encrypted message as the second input;
   generating, by the sending computer and based on the determinings, the key-specific decryption engine including the one or more boolean functions; and
   providing, by the sending computer to a receiving computer, the generated key-specific decryption engine, wherein the receiving computer including the provided key-specific decryption engine is configured for decrypting the encrypted message without requiring the symmetric key as an input to the provided key-specific decryption engine for the decrypting.

2. The method of claim 1, wherein each of the one or more boolean functions generates as an output a single bit based on one or more bits of input, the output being a bit which is either an input to another one of the boolean functions or an output of the key-specific decryption engine, each of the one or more bits of input being either a bit of an encrypted message or an output generated by another one of the boolean functions.

3. The method of claim 1, wherein the one or more boolean functions are determined using truth tables created in accordance with the expected outputs and the different values specified for the second input.

4. The method of claim 3, further comprising: determining a sum of products corresponding to the one or more boolean functions in accordance with the truth tables.

5. The method of claim 3, further comprising: determining a product of sums corresponding to the one or more boolean functions in accordance with the truth tables.

6. The method of claim 1, wherein the determining one or more boolean functions includes determining a plurality of partitions, each partition corresponding to a portion of the boolean functions.

7. The method of claim 6, wherein an output of a first partition of the plurality of partitions is an input to a second of the plurality of partitions.

8. The method of claim 7, wherein each of the plurality of partitions corresponds to an iteration of processing performed in connection with performing a decryption operation for the symmetric cryptographic technique.

9. The method of claim 7, wherein each of the plurality of partitions corresponds to a cryptographic round.

10. The method of claim 9, wherein each cryptographic round includes a plurality of stages.

11. A system comprising a computing device and at least one program module that are together configured for performing actions for generating a key-specific decryption engine, the actions comprising:
   providing, to a sending computer, a reference implementation of a decryption engine configured to perform a decryption operation of a symmetric cryptographic technique, the reference implementation of the decryption engine configured to accept a symmetric key as a first input and an encrypted message as a second input, where the encrypted message is an encrypted version of an original message that was previously encrypted using the symmetric key;
   determining, by the sending computer using the reference implementation, expected outputs corresponding to different values specified for the second input, where the expected outputs include the original message that corresponds to the encrypted message as a corresponding one of the different values;

determining, by the sending computer, one or more boolean functions configured for generating the expected outputs including the original message based on the symmetric key as the first input and the different values including the encrypted message as the second input;

generating, by the sending computer and based on the determinings, the key-specific decryption engine including the one or more boolean functions; and providing, by the sending computer to a receiving computer, the generated key-specific decryption engine, where the receiving computer including the provided key-specific decryption engine is configured for decrypting the encrypted message without requiring the symmetric key as an input to the provided key-specific decryption engine for the decrypting.

12. The system of claim 11, where each of the one or more boolean functions generates as an output a single bit based on one or more bits of input, the output being a bit which is either an input to another one of the boolean functions or an output of the key-specific decryption engine, each of the one or more bits of input being either a bit of an encrypted message or an output generated by another one of the boolean functions.

13. The system of claim 11, where the one or more boolean functions are determined using truth tables created in accordance with the expected outputs and the different values specified for the second input.

14. The system of claim 11, where the determining one or more boolean functions includes determining a plurality of partitions, each partition corresponding to a portion of the boolean functions.

15. The system of claim 11, the actions further comprising:
determining a sum of products corresponding to the one or more boolean functions in accordance with the truth tables; or
determining a product of sums corresponding to the one or more boolean functions in accordance with the truth tables.

16. At least one storage device storing computer-executable instructions that, when executed by a computing device, causes the computing device to perform actions for generating a key-specific decryption engine, the actions comprising:
providing, to a sending computer, a reference implementation of a decryption engine configured to perform a decryption operation of a symmetric cryptographic technique, the reference implementation of the decryption engine configured to accept a symmetric key as a first input and an encrypted message as a second input, where the encrypted message is an encrypted version of an original message that was previously encrypted using the symmetric key;

determining, by the sending computer using the reference implementation, expected outputs corresponding to different values specified for the second input, where the expected outputs include the original message that corresponds to the encrypted message as a corresponding one of the different values;

determining, by the sending computer, one or more boolean functions configured for generating the expected outputs including the original message based on the symmetric key as the first input and the different values including the encrypted message as the second input;

generating, by the sending computer and based on the determinings, the key-specific decryption engine including the one or more boolean functions; and providing, by the sending computer to a receiving computer, the generated key-specific decryption engine, where the receiving computer including the provided key-specific decryption engine is configured for decrypting the encrypted message without requiring the symmetric key as an input to the provided key-specific decryption engine for the decrypting.

17. The at least one storage device of claim 16, where each of the one or more boolean functions generates as an output a single bit based on one or more bits of input, the output being a bit which is either an input to another one of the boolean functions or an output of the key-specific decryption engine, each of the one or more bits of input being either a bit of an encrypted message or an output generated by another one of the boolean functions.

18. The at least one storage device of claim 16, where the one or more boolean functions are determined using truth tables created in accordance with the expected outputs and the different values specified for the second input.

19. The at least one storage device of claim 16, where the determining one or more boolean functions includes determining a plurality of partitions, each partition corresponding to a portion of the boolean functions.

20. The at least one storage device of claim 16, the actions further comprising:
determining a sum of products corresponding to the one or more boolean functions in accordance with the truth tables; or
determining a product of sums corresponding to the one or more boolean functions in accordance with the truth tables.

* * * * *